Sept. 14, 1943.　　　J. LEDWINKA　　　2,329,545
AUTOMOBILE ESPECIALLY RUNNING GEAR FOR SAME
Filed May 28, 1940　　　3 Sheets-Sheet 1

INVENTOR
Joseph Ledwinka
BY John P. Tarbox
ATTORNEY

Sept. 14, 1943. J. LEDWINKA 2,329,545
AUTOMOBILE ESPECIALLY RUNNING GEAR FOR SAME
Filed May 28, 1940 3 Sheets-Sheet 2
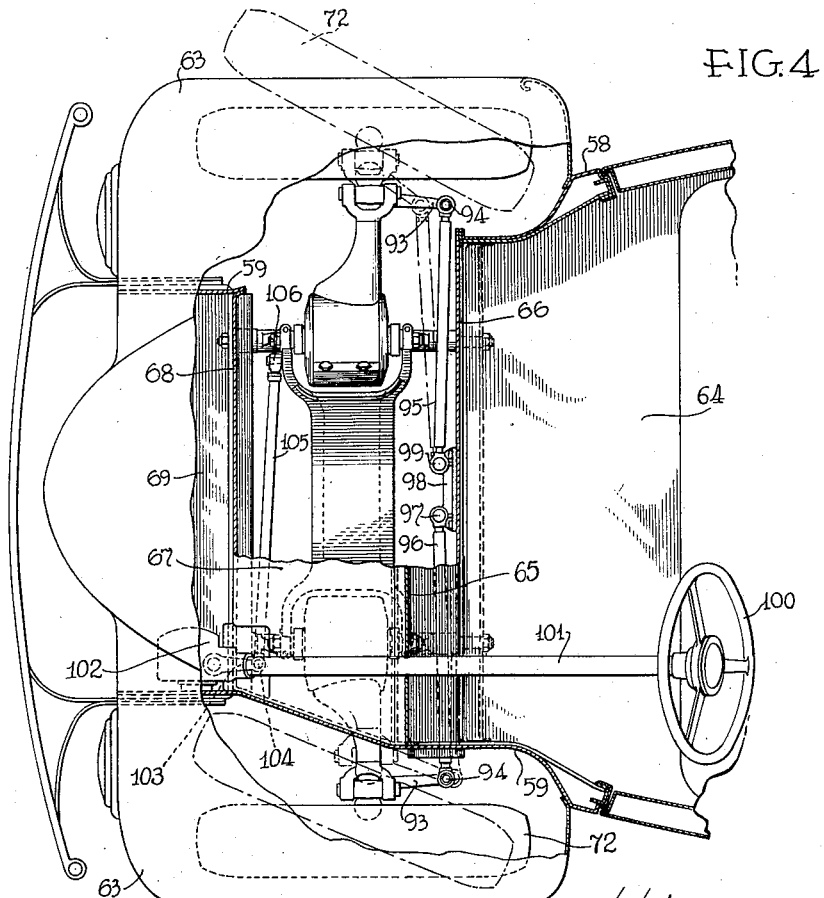
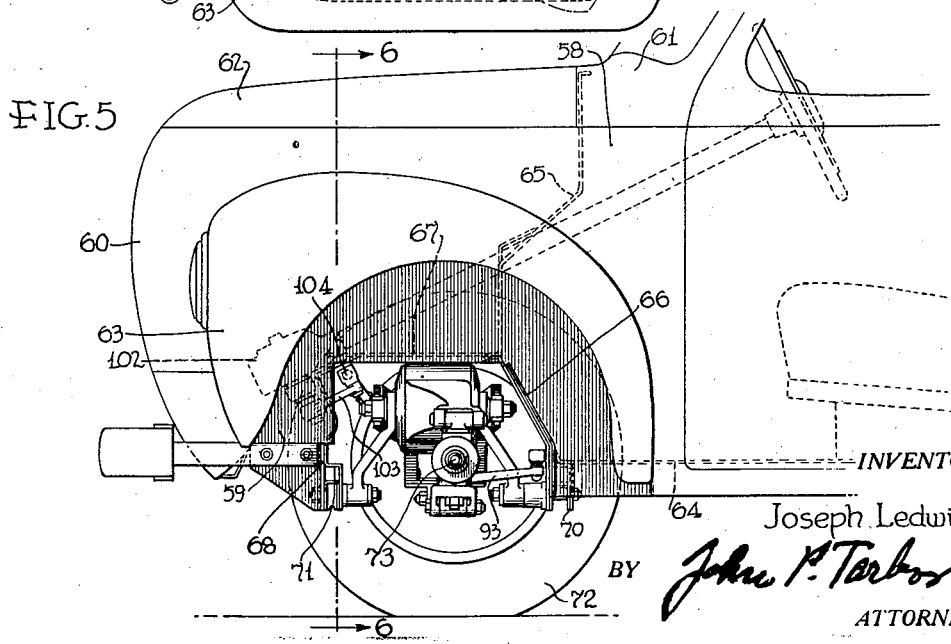
INVENTOR
Joseph Ledwinka
BY John P. Tarbox
ATTORNEY Patented Sept. 14, 1943

2,329,545

UNITED STATES PATENT OFFICE 2,329,545

AUTOMOBILE, ESPECIALLY RUNNING GEAR FOR SAME

Joseph Ledwinka, Philadelphia, Pa., assignor to Edward G. Budd Manufacturing Company, Philadelphia, Pa., a corporation of Pennsylvania Application May 28, 1940, Serial No. 337,566

19 Claims. (Cl. 280—95)

The invention relates to an automobile and more particularly to an automobile of the type having the motor at its one end, preferably the rear end, and the steering ground wheels at its other end.

Among the objects of the invention is such a formation and arrangement of the steering ground wheels, the suspension means between the wheels and the body or chassis, and of the means for imparting steering movement to the wheels that the width of the useful space between the wheels can be increased with the customary automobiles.

Another object of the invention has to do with a wheel suspension and steering device which is adapted for the achievement of the before-mentioned object, which is rugged and durable in construction and which affords proper steering geometry.

A still further object of the invention is a wheel suspension and steering arrangement which affords good springing qualities and which entails simultaneously a desirable performance of the automobile body while driving through curves.

Further objects and advantages of the invention as well as the outstanding features and details thereof, will become apparent from the following description of some embodiments when read in conjunction with the attached drawings, and from the claims forming a part of this specification.

In the drawings:

Figure 4 is a fragmentary plan view of the front end of a self-supporting automobile body, certain parts of which are broken away, and of the wheel suspension and steering arrangement of another embodiment according to the invention.

Figure 5 is a fragmentary side elevation of the structure shown in Figure 4, yet the one ground wheel being omitted;

Figure 1:
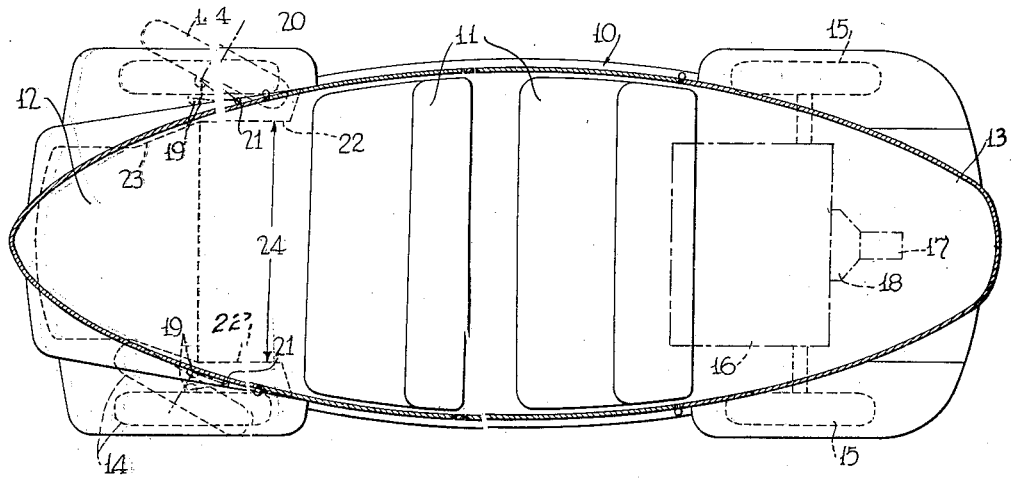
Figure 1 is a diagrammatic plan view of an automobile with the body in section and showing some of the basic principles of the invention.

The automobile diagrammatically shown in Figure 1 comprises a body 10 with a central passenger compartment 11, a front section 12, and a rear section 13. This body is supported with or without a chassis frame by front wheels 14, and rear wheels 15. The locations of the driving motor 16, of the gear box 17 and of the differential 18 in the rear body section 13 are diagrammatically indicated by dotted lines. The transmission of the driving torque from the motor to the rear wheels 15 and the suspension of the rear end of the automobile on these wheels may be carried out in any conventional manner, or the arrangement of the motor, the rear wheels, and the associated parts, may correspond to Patent 2,286,609, Wheel suspension for vehicles, issued June 16, 1942, on my application Serial No. 335,813 of May 17, 1940. The suspension of the front wheels 14 at the sides of the front portion 12 of the body or chassis, and the steering gear for these wheels will be disclosed in detail by the following description of the further figures of the drawings. Figure 1 indicates however the general principle which consists therein that the wheels 14 are not swung relatively to the body or chassis about the axes 19 which intersect the horizontal axis of rotation 20 of the wheels but about vertical axes 21 which are considerably spaced rearwardly from said axes 19 and 20. The body side walls between the front wheels are arranged substantially as indicated by the dotted lines 22 and 23. The distance 24 between the rear sections 22 of the side wall portions is comparatively great and gives ample foot room to the occupants of the front seat whereas the wall sections 23, the space between which is of no great use anyhow, converge toward each other and the front end of the automobile.

In the embodiment shown in Figures 2 and 3, 25 and 26 designate the longitudinal side sills and 27 a front cross member of the chassis frame. 28 is a transverse axle, the ends of which support swingably about vertical pins 29 stub axle members 30. These stub axle members 30 carry, rotatably around substantially horizontal axes 31, the ground wheels 32. The stub axle members 30 are each provided with a rearwardly extending arm 33, the ends of which are connected by universal joints 34, to a transverse tie rod 35. Another tie rod 36 extends between the end of one of the arms 33 and a bracket 37 which latter is fixed to the sill 25, the connections for this rod

36 at 34 and 38 being also universal joint connections.

On both sides of the longitudinal center line of the vehicle, the axle 28 is provided with upwardly and downwardly directed extensions 39, 40. The upper extensions 39 are connected by universal joints 41 to the ends of link members 42; the other ends of these links are connected by universal joints 43 to the front ends of the side sills 25, 26. The lower axle extensions 40 are connected by universal joints 44 to links 45 which extend about parallel to and are downwardly spaced from the links 42. The forward ends of the links 45 are journaled by a pin connection 46 to stub shafts 47. The axis of each pin connection 46 extends transversely to the link member 45 and the stub shaft 47. These stub shafts are rotatably supported around a substantially horizontal axis in casings 48 which latter are rigidly connected to the forward portions of the chassis frame 25, 26, 27. The stub shafts 47 and the casings 48 form parts of torsion spring devices, for instance, of the type shown in the beforementioned Patent 2,286,609, and/or of any conventional or desired type of shock absorbers.

A rod 49 is connected to the axle 28 by a universal joint 50, the other end of this rod being journaled at 51 to the arm 52 of a conventional steering gear 53. The gear 53 carries the lower end of the steering column 54 which latter carries the steering wheel 55.

Figure 2:
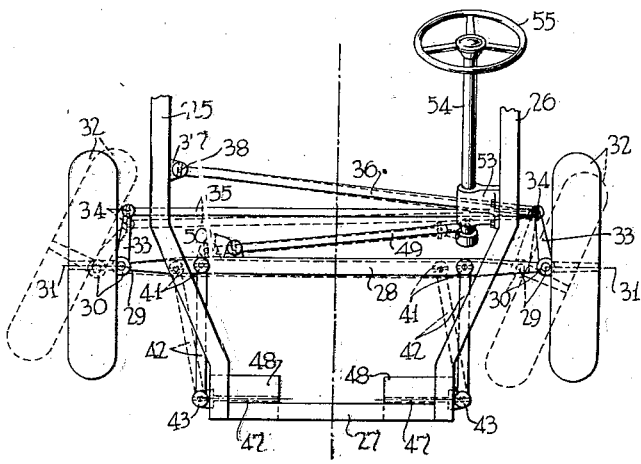
Figure 2 is a diagrammatic plan view on a larger scale of the front end of a chassis frame together with the steering mechanism, the steering ground wheels and the wheel suspension system.

As shown in Figure 2, the front end of the side sills 25, 26 is in the form of an inverted U as to provide space for the axle and the adjoining members. The axle suspension links 42, 45 are journaled to the front downwardly extending arms 56 of the U-shaped portion whereas the bracket 37 and the steering gear 53 are fastened to the rear downwardly extending arm 57 of the U.

Figure 3:
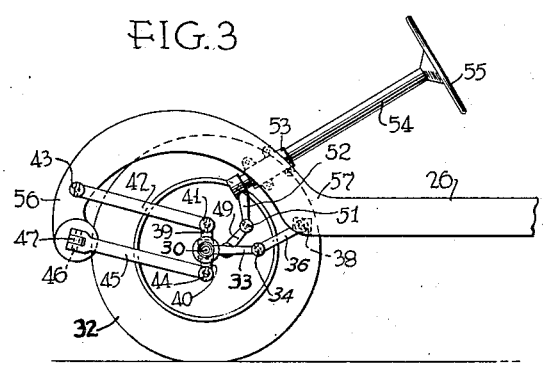
Figure 3 is a side elevation of the arrangement shown in Figure 2, yet the one ground wheel being omitted.

The embodiment as shown in Figures 2 and 3 works as follows: The front end of the chassis frame 25, 26, 27, is supported on the wheels 32 by means of the spring devices 47, 48, the links 42, 45, the axle 28 and the stub axles 30. The journal connections between the chassis frame and the said links on the one hand and between said links and said axle on the other hand, allow free up and down movement of the axle with respect to the chassis frame save for the reaction of the spring device. By turning the steering wheel 55, the rod 49 moves the axle 28 transversely which movement is again permitted by the links 42, 45 and by the journal connections between the links, said axle and the chassis frame. By transversely moving the axle 28 the king pins 29 and the centers of the wheels 32 are also transversely dislocated but the ends of the stub axle arms 33 cannot participate in such movement owing to their connections to the chassis frame member 25 by means of the rods 35, 36 and the joints 34, 38. These latter connections cause the stub axle members together with the wheels to swing around axes which pass through the centers of the joints 34. One steering position of the wheels, the axle and other associated parts is indicated in Figure 2 by dotted lines. It is apparent that such steering movement causes the rear portion of the one wheel to move much less inwardly toward the adjacent chassis frame member than the front portion of the opposite wheel.

This geometry of the steering movement of the ground wheel allows a greater distance between the side sills 25, 26 in rear of the axle 28, whereas the side sills have to converge rather sharply in front of the axle. Yet, the width between the side sills in rear of the front axle is greater than with usual wheel suspensions and steering arrangements, and this increased width is far more valuable because it increases the available foot room for the front seat occupants. The decrease of width between the side sills in the front of the axle is not objectionable because the space in this region does mostly not serve for any important purpose and can only be used for the storage of small parts such as tools, spare tires, or the like, for which even the reduced space is sufficient.

The fact that the suspension links 42, 45 are attached by their front ends to the chassis frame and by their rear ends to the axle causes the tendency of the axle and of the wheels to return automatically to the central position. The arrangement of the axle substantially in the same vertical plan with the axes of rotation of the wheels means that the axle and its connections with the stub axles, as well as the stub axles themselves, are kept free from undue torsional and bending stresses which might lead to premature wear, or might necessitate a heavy and expensive construction.

It has to be borne in mind that the embodiment as shown in Figures 2 and 3, in which a resiliently suspended axle is arranged in about the same vertical plan with the axes of rotation of the wheels and the axes of the king pins for the stub axles, is liable to many modifications. Such modifications may for instance concern the means for guiding the axle in vertical and in transverse direction; or they may for instance concern the spring and the shock absorbing means for keeping one point of each of the stub axles substantially stationary in a horizontal plan with respect to the chassis frame or its substitute.

The embodiment shown in Figures 4 to 7 is applied to a so-called self-supporting body or combined body and chassis structure. Such type of body being now well-known in the art, it is only necessary to describe it as far as it is shown in the drawing and as it affects the new steering wheel suspension.

The substantially vertical side walls 58 of the cowl are forwardly extended as to form vertical wheel housing and luggage compartment walls 59 and the luggage compartment front wall 60. The cowl side panels 58 are inter-connected by a cowl top panel 61 and the luggage compartment is closed by the removable cover 62. Fenders 63 are fastened at the sides to the walls 59. The panels 58, 59 on opposite sides of the automobiles are furthermore inter-connected and strongly interbraced against each other by the floor panel 64, the dashboard 65, the toe board 66, the horizontal wall portion 67 in front of the dashboard 65 and of the toe board 66, a downwardly extending wall 68 which is attached to the wall 67, and forwardly spaced from the toe board 66. The space between the wall 68 and the front wall 60 of the luggage compartment is closed by a panel 69. The walls 66, 67, 68 form together a downwardly facing tunnel which extends transversely across the front end of the car. The lower margins of this tunnel are not only reinforced by the adjoining floor portions 64, 69 but additionally by reinforcing rails 70 and 71. The different panels and walls so far described are preferably provided with overlapping flanges and are connected to each other in the overlapping regions such as by electric spot welding.

Housed in the tunnel formed by the walls 66, 67, 68, are the means for resiliently supporting and for steering the front wheels 72. The wheels 72 are rotatably supported on stub axles 73 which latter may be substantially of more or less conventional construction and which are mounted swingably about substantially vertical axes on king pin members 74. The members 74 are journaled at 75 to upper and lower links 76, 77. These links are about horizontally arranged in a vertical transverse plane and the links on each side of the automobile extend about parallel to each other. The inner ends of each pair of links 76, 77 are journaled at 78 and 79 to a transversely extending central structure 80.

The structure 80 may be composed of substantially vertical sheet metal stampings 81, horizontal stampings 82, 83, and may be provided with appropriate brackets such as 84 and 85 for the journals 78 and 79 and for other journals to be described later. The members composing the structure 80 are again preferably united with each other by overlapping flanges and electric spot welding.

At the joint 78, between each link 76, and the structure 80, a torsion spring and/or a shock absorber may be provided in the housing 86 which concentrically surrounds the axis of the respective journal 78. The construction of such torsion spring may be of the type as shown in my before-mentioned Patent No. 2,286,609.

Figure 6:
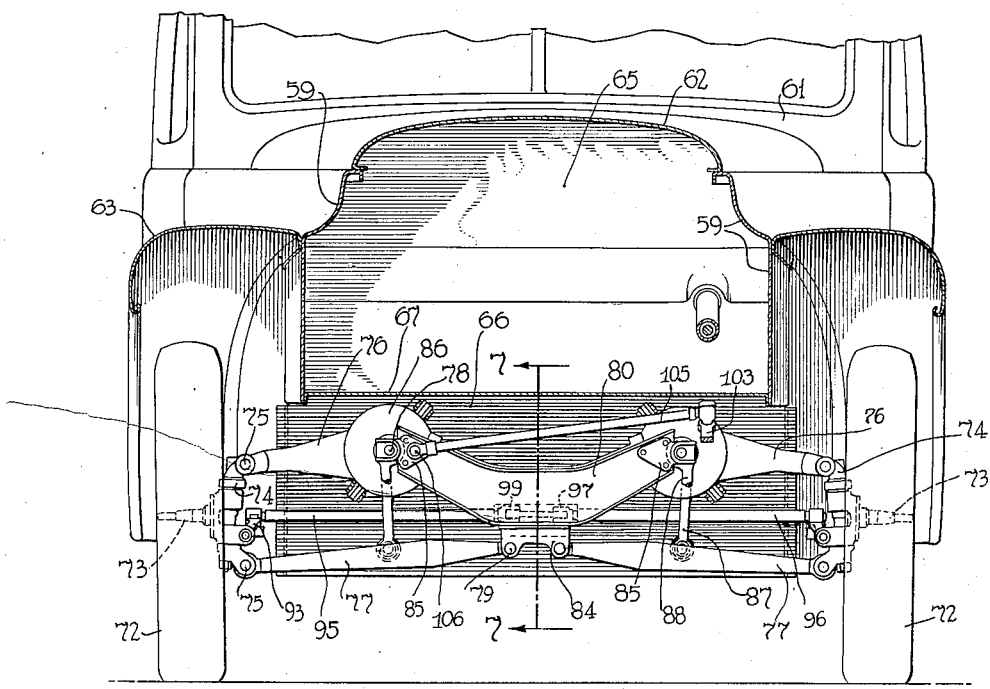
Figure 6 is a front elevation, partly in section along line 6—6 of Figure 5.
Figure 7:
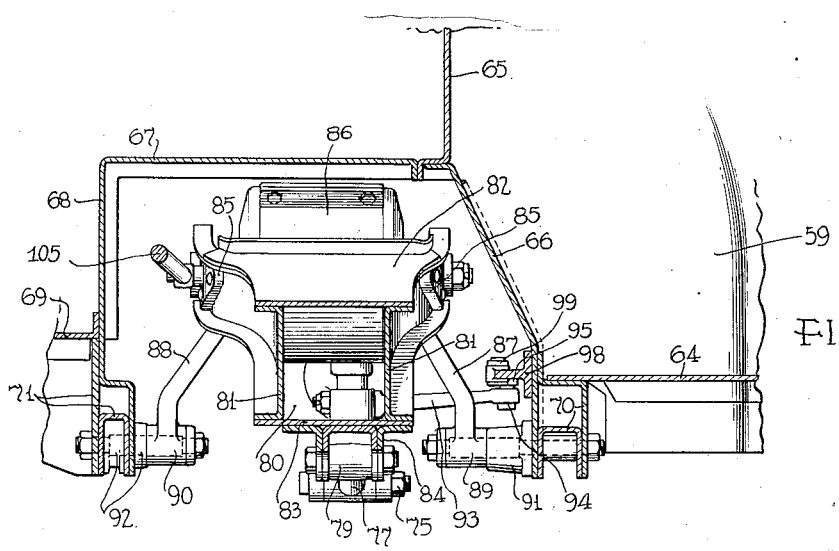
Figure 7 is a fragmentary sectional view on a larger scale substantially along line 7—7 of Figure 6.

The upper ends of two pairs of links 87, 88 are journaled in the region of the previously described journals 78 to both ends of the structure 80. The lower ends of these links 87, 88 are journaled at 89 and 90 near the lower margins of the previously described transverse tunnel to the walls 66, 68 and their reinforcing rails 70, 71, the points of attachment for these journals being appropriately reinforced by brackets such as 91, 92. The links 88, 87 on opposite sides of the longitudinal middle plane of the automobile are slightly inclined with respect to each other and converge preferably toward their lower ends as shown in Figure 6.

Each stub axle 73 is rigidly connected to a rearwardly extending arm 93, each of these arms being journaled at 94 to tie rods 95, 96, which latter have their other ends journaled at 97, 99 to a bracket 98, this bracket being rigidly fastened to the wall 66 of the tunnel.

A steering hand wheel 100, a steering column 101 and a steering gear 102 of any convenient construction are arranged in the position shown in the drawings, the steering gear 102 being supported by the wheel housing side wall 59 which forms a structural member of the self-supporting body. The lever 103 of the steering gear is journaled at 104 to a rod 105. The other end of the rod 105 is journaled at 106 to one of the brackets 85 which latter forms an integral member of the transverse structure 80.

The functioning of the embodiment shown in Figures 4 to 7, is in many respects exactly the same as described in connection with the embodiment shown in Figures 2 and 3. The difference consists mainly therein that in the embodiment of Figures 2 and 3 the chassis or body and the axle are moved up and down relative to each other as a whole when traveling over uneven ground, whereas the device shown in Figures 4 to 7 comprises the transverse structure 80 which does not participate in such up and down movement which movement is confined to the links 76, 77 and the parts connected to their outer ends. The steering movement is however in both cases about the same. Although in the embodiment of Figures 4 to 7, the entire axle structure including the member 80, is moved transversely as one unit with the parts which are attached thereto, the stub axles 73 with the ground wheels 72 have to turn with respect to the body about the substantially stationary journals 94.

The suspension of the body or chassis on the structure 80, by means of the pairs of about vertical links 88, 87, has again the advantage that body and structure 80 together with the ground wheels will always automatically return to the central relative position if not prevented from doing so by the actuation of the steering gear. This tendency is caused by the geometry of the suspension of the structure 80 which requires the body or chassis to be slightly raised while the structure 80 is transversely dislocated. It will be easily understood that such transverse dislocation requires the journals 89 and 90 to move on circles having the journals 78 as centers, and as the normal positions of the links 87, 88 are substantially vertical, the dislocation requires an upward movement on such circles. This embodiment has the additional advantage that an appropriate location of the journal of the suspension links 87, 88 relative to the center of gravity of the automobile will prevent outward sway or even cause the highly desirable inward inclination of the body while driving through a curve.

Also the embodiment shown in Figures 4 to 7 is liable to many modifications without departing from its main principle. The transverse structure 80 may take many different forms, it may support the body or chassis in many different ways, the wheels may be attached to and resiliently supported by the transverse structure in many different ways, nearly any one of the many well-known independent wheel suspensions being adapted to be substituted for the particular suspension which is shown in the embodiment. Furthermore, the means for guiding the stub axles can, as it will be obvious to anyone skilled in the art, be carried out by numerous different means. Finally, many different means apart from those shown in the embodiment are available for achieving the tendency of the transverse axle structure to return into its central position relative to the body or chassis.

In general, the invention is susceptible of many modifications without departing from the spirit of the invention. All such modifications are supposed to be covered by the spirit and the letter of the appended claims. It may additionally be mentioned that the invention is for instance, not necessarily restricted to steering wheels arranged at the front end of the automobile and furthermore not necessarily restricted to an automobile having the steering wheels and the motor at different ends, although the new steering wheel suspension is regarded as an important factor for promoting the adoption of the rear engine drive for pleasure cars. Certain expressions used in the claims for the sake of brevity such as "body or chassis frame structure," "stub axle," "axle," "transverse structure," "spring suspension means," and others, are to be understood in a very broad sense and are not intended to limit the scope of the claims unless specifically indicated by additional statements in some of the claims.

What I claim is:

1. In an automobile, ground wheels rotatably mounted on stub axles, a body or chassis frame structure, means for suspending one end of said frame structure on said wheels, said means being adapted to allow each of said stub axles together with its respective wheel to turn about a substantially vertical axis, such axis being situated near to the plane of the respective wheel but spaced a substantial distance from the wheel center in the direction toward the transverse vertical middle plane of the automobile, means on said frame structure adapted to swing said wheels in unison about said axes about an angle at least as great as conventional in automobiles, the steering movement of the wheels causing those parts of the wheels which are located nearer to the transverse vertical middle plane of the automobile to move less toward the longitudinal center line of the automobile than those wheel portions which are located toward the end of the body or frame structure and thereby less than the corresponding wheel portion in conventional automobiles, the width of said body or chassis structure between the wheels on that side of the stub axles, which lies toward said transverse middle plane being as great as compatible with the angular movement of the wheels, thereby increasing the width of the useful space of the automobile between said wheels as compared with conventional automobile structures.

2. In an automobile, front ground wheels rotatably mounted on stub axles, a body or chassis frame structure, means for suspending the front end of said frame structure on said stub axles and wheels, said means being adapted to allow each of said stub axles together with its respective wheel to swing about a substantially vertical axis, such axis being situated near to the plane of the respective wheel but spaced a substantial distance rearwardly from the wheel center, means on said frame structure adapted to swing said wheels in unison about said axes through a horizontal angle of a size substantially as usual in conventional automobiles, the steering movement of the wheels causing the rear portions of the wheels to move less toward the longitudinal center line of the automobile than the front portion and thereby less than the corresponding wheel part in conventional automobiles, the width of said body or chassis structure between the wheels being as great as the angular movement of the wheels permits and greater behind the wheel centers than in front thereof, thereby increasing the foot room for front seat occupants of the automobile beyond the foot room which is available in conventional automobiles.

3. In an automobile, a body or chassis frame structure, a transversely extending axle near one end of said frame structure, means for resiliently supporting said frame structure on said axle and for allowing relative transverse movement between said axle and said frame structure, a pair of stub axles each supporting rotatably a ground wheel, one stub axle being pivotally connected to each end of said axle swingably about a substantially vertical axis, the axes of said stub axles being arranged in about the transverse vertical plane defined by said axle, connections between said stub axles and portions of said frame structure keeping one point of each stub axle in plan view substantially at the same location relative to said frame structure, means on said frame structure for imparting to said axle a transverse movement relative to said frame structure whereby said wheels are swung substantially about said points.

4. In an automobile, a body or chassis frame structure, a transversely extending axle near one end of said frame structure, means for resiliently supporting said frame structure on said axle and for allowing relative transverse movement between said axle and said frame structure, one stub axle each at each end of said axle, each stub axle supporting rotatably a ground wheel and being pivotally connected to said axle swingably about a substantially vertical axis, each of said stub axles being provided with an extension which is directed toward the vertical transverse middle plane of the automobile, connections between said extensions and portions of said frame structure which connections are adapted to allow pivotal movement of said extensions at the connecting points but preventing any substantial transverse movement thereof in a horizontal plane, means on said frame structure for imparting to said axle a transverse movement relative to said frame structure whereby said wheels will swing substantially about the points of connections between the stub axle extensions and the frame structure portions.

5. In an automobile, a body or chassis frame structure, a second structure or member supporting said frame structure and being adapted for transverse movement with respect to the latter, means at the ends of said member for independently and resiliently supporting one ground wheel each, said means including a stub axle for each wheel and a pivot connection with adjoining portions of said means, the axis of each pivot connection being about vertical, an extension on each stub axle, a connection including a journal between a portion of said frame and each of said stub axle extensions, those connections being spaced from the axis of each stub axle in the direction toward the transverse vertical middle plane of the automobile, being substantially stationary in plan view with respect to said frame structure but adapted to allow the up and down movement of said wheels, means on said frame structure for imparting transverse relative movement between said frame structure and said member.

6. In an automobile, a body or chassis frame structure, a second structure or member supporting said frame structure and being adapted for transverse movement with respect to the latter, a pair of ground wheels each being supported by a stub axle, means between each one of said stub axles and one of the ends of said member, which means provide for resilient up and down movement of said stub axles with respect to said member and for pivotal movement about a substantially vertical axis, such axis being located near to the respective wheel, connecting means between a point of each of said stub axles, which is spaced in longitudinal direction from the respective vertical axis, and portions of said frame structure, said connecting means keeping one point of each stub axle in plan view substantially stationary with respect to said frame structure, means on said frame structure for transversely moving said member and said frame structure relatively to each other, whereby said stub axles together with the wheels are swung relative to said second structure about said vertical axes and with respect to said frame structure about said stationary points.

7. In an automobile, a body or chassis frame structure, a transverse structure extending at least partly across and being arranged near one end of said frame structure, said transverse structure constituting part of means for supporting one end of said frame structure, stub axles, ground wheels supported by said stub axles rotatably about substantially horizontal axes, said stub axles being connected to the ends of said transverse structure swingably about substantially vertical axes and supporting said transverse structure, each of said vertical axes being arranged near to the respective ground wheel, means for imparting to said frame structure and said transverse structure a movement relative to each other in a direction transversely to the longitudinal vertical middle plane of the automobile, means between said frame structure and said stub axles holding one point of each stub axles in plan view substantially stationary with respect to said frame structure if the transverse structure and said frame structure are moved transversely relative to each other, said points being spaced from said vertical axes a substantial distance in the direction toward the vertical transverse middle plane of the automobile, such arrangement causing those portions of the wheels which are located nearer to the transverse vertical middle plane of the automobile to move less toward the longitudinal middle line of the automobile than those wheel portions which are located on the opposite side of the wheel centers.

8. In an automobile, a body or chassis frame structure, a transverse structure extending across and being arranged near one end of said frame structure, said transverse structure constituting part of means for supporting one end of said frame structure, stub axles supporting ground wheels rotatably about substantially horizontal axes, said stub axles being fastened to the ends of said transverse structure swingably about substantially vertical axes, each such vertical axis being arranged near to the plane of the respective ground wheel, means for imparting to said frame structure and said transverse structure a movement relative to each other in a direction transversely to the longitudinal vertical middle plane of the automobile, a swivel connection between each stub axle and a portion of said frame structure permitting swivel movements of the former relative to the latter about a center being in plan view substantially stationary, each of such swivel centers being spaced substantially from the respective vertical axis in a direction toward the vertical transverse middle plane of the automobile, relative transverse movement between said frame structure and said transverse structure causing said stub axles to swing about said centers and to move those portions of the wheels which are located nearer to the transverse vertical middle plane of the automobile less toward the longitudinal middle line of the automobile than those wheel portions which are located near the end of said frame structure, whereby greater useful space is provided between said wheels on that side of the transverse structure which lies toward the transverse vertical middle plane of the automobile.

9. In an automobile, a body or chassis frame structure, a transversely extending axle near one end of said frame structure, means for resiliently supporting said frame structure on said axle, two pairs of links, one on each side of the automobile, said links extending substantially in the longitudinal direction of the automobile, the two links of each pair being arranged the one higher than the other, universal joint connections between one end of each link and said frame structure and between the other end and said axle as to allow relative transverse and up and down movements between said axle and said frame structure, a stub axle at each end of said axle rotatably supporting a ground wheel and being pivotally connected to said axle swingably around a substantially vertical axis, a connection between each of said stub axles and a portion of said frame structure which connection is keeping one point of the respective stub axle with respect to said frame structure substantially on a vertical line and preventing any substantial transverse movement thereof, means on said frame structure for imparting to said axle a transverse movement relative to said frame structure whereby said stub axles and wheels are swung substantially about said points.

10. In an automobile, a body or chassis frame structure, a transversely extending axle near one end of said frame structure, two pairs of links one on each side of the automobile, said links extending substantially in the longitudinal direction of the automobile, the two links of each pair being arranged the one higher than the other with respect to the ground level, universal joint connections between one end of each link and said frame structure and between the other end of each link and said axle as to allow relative transverse and up-and-down movements between said axle and said frame structure, at least one universal joint connection of each pair of links comprising a member which is rotatably mounted on the adjoining portion of the automobile about a substantially horizontal axis and furthermore a pivot connection having its axis of rotation disposed substantially vertical to said horizontal axis, spring suspension means such as a torsion spring or a shock absorber being inserted between said member and the adjoining automobile portion, a stub axle at each end of said axle rotatably supporting a ground wheel and being pivotally connected to said axle swingably around a substantially vertical axis, a connection between each of said stub axles and a portion of said frame structure which connection keeps one point of the respective stub axle with respect to said frame structure substantially on a vertical line, means on said frame structure for imparting to said axle transverse movement relative to said frame structure whereby said stub axles and wheels are swung substantially about said points.

11. In an automobile, a body or chassis frame structure, a transverse structure or member extending at least partly across said frame structure near to and supporting one end of the latter, stub axles, ground wheels supported by said stub axles rotatably about substantially horizontal axes, said stub axles being fastened to the ends of said transverse structure or member swingably about substantially vertical axes each of which vertical axes is arranged near to the plane of the respective ground wheel, means for imparting to said frame structure and said transverse structure a movement relative to each other in a direction transversely to the longitudinal vertical middle plane of the automobile, means for rendering resilient the support of said frame structure on said stub axles and ground wheels, journal connections between at least one stub axle and one end of a transversely extending rod and between the other end of such rod and a point of said frame structure, the center of such connection between said stub axle and said rod being spaced substantially from said vertical stub axle axis in the longitudinal direction of the automobile, as to hold one point of said stub axle in plan view substantially stationary with respect to said frame structure if said transverse structure or member and said frame structure are moved transversely relative to each other but as to allow up and down movement of the stub axle.

12. In an automobile, a body or chassis frame structure, a transverse structure or member extending at least partly across said frame structure near to and supporting one end of the latter, stub axles, ground wheels supported by said stub axles rotatably about substantially horizontal axes, said stub axles being fastened to the ends of said transverse structure or member swingably about substantially vertical axes each of which vertical axes is arranged near to the plane of the respective ground wheel, means for imparting to said frame structure and said transverse structure a movement relative to each other in a direction transversely to the longitudinal vertical middle plane of the automobile, means for rendering resilient the support of said frame structure on said stub axles and ground wheels, journal connections between one stub axle and one end of a transversely extending rod and between the other end of such rod and a point of said frame structure, the center of such connection between said stub axle and said rod being spaced substantially from said vertical stub axle axis in the longitudinal direction of the automobile, as to hold one point of said stub axle in plan view substantially stationary with respect to said frame structure if said transverse structure or member and said frame structure are moved transversely relative to each other but allowing up and down movement of the stub axle, and a tie rod inserted between and journaled to each stub axles at points spaced from said vertical stub axle axes.

13. In an automobile, a body or chassis frame structure, a transverse structure extending at least partly across said frame structure near to one end of the latter, stub axles, ground wheels supported by said stub axles rotatably about substantially horizontal axes, said stub axles being fastened to the ends of said transverse structure swingably about substantially vertical axes each of which vertical axes is arranged near to the plane of the respective ground wheel, means for supporting said frame structure on said transverse structure, said supporting means being adapted for relative transverse movement between said frame structure and said transverse structure and furthermore for a slight vertical raise of said frame structure relative to said transverse structure if both are moved transversely out of a central normal position, means for imparting to said frame structure and said transverse structure a movement relative to each other in a direction transversely to the longitudinal vertical middle plane of the automobile, means between said frame structure and said stub axles holding one point of each stub axle in plan view at substantially the same location with respect to said frame structure if the transverse structure and said frame structure are moved transversely relative to each other, said points being spaced from said vertical axes a substantial distance in the longitudinal direction of the automobile.

14. In an automobile, a body or chassis frame structure, a transverse structure extending at least partly across said frame structure near to one end of the latter, stub axles, ground wheels supported by said stub axles rotatably about substantially horizontal axes, said stub axles being fastened to the ends of said transverse structure swingably about substantially vertical axes each of which vertical axes is arranged near to the plane of the respective ground wheel, means for supporting said frame structure on said transverse structure, said supporting means comprising at least one pair of upstanding links, said links being arranged on different sides of the longitudinal middle line of the body, the lower ends of said links being journaled to said frame structure and the upper ends being journaled to said transverse structure, the normal position of said links being substantially symmetrical to the vertical longitudinal middle plane of the automobile, means for imparting to said frame structure and said transverse structure a movement relative to each other in a direction transversely to the longitudinal vertical middle plane of the automobile, means between said frame structure and said stub axles confining one point of each stub axle substantially to a line being about vertical and stationary with respect to said frame structure if the transverse structure and said frame structure are moved transversely relative to each other, said points being spaced from said vertical axes a substantial distance in the longitudinal direction of the automobile.

15. In an automobile, a body or chassis frame structure, a transverse structure extending at least partly across said frame structure near to one end of the latter, stub axles, ground wheels supported by said stub axles rotatably about substantially horizontal axes, said stub axles being fastened to the ends of said transverse structure swingably about substantially vertical axes each of which vertical axes is arranged near to the plane of the respective ground wheel, means for supporting said frame structure on said transverse structure, said supporting means comprising at least one pair of upstanding links, said links being arranged on different sides of the longitudinal middle line of the body, journals between the lower ends of said links and said frame structure and between the upper ends and said transverse structure, the said links in their normal position being substantially symmetrical to and converging toward the vertical longitudinal middle plane of the automobile, means for imparting to said frame structure and said transverse structure a movement relative to each other in a direction transversely to the longitudinal vertical middle plane of the automobile, means between said frame structure and said stub axles holding in plan view one point of each stub axle substantially stationary with respect to said frame structure if the transverse structure and said frame structure are moved transversely relative to each other, said points being spaced from said vertical axes a substantial distance in the longitudinal direction of the automobile.

16. In an automobile, a body or chassis frame structure, a transverse structure extending at least partly across said frame structure near to one end of the latter, stub axles, ground wheels supported by said stub axles rotatably about substantially horizontal axes, said stub axles being fastened to the ends of said transverse structure swingably about substantially vertical axes each of which vertical axes is arranged near to the plane of the respective ground wheel, means for supporting said frame structure on said transverse structure, said supporting means comprising two pairs of upstanding links, the links of different pairs being spaced from each other in the longitudinal direction of the automobile, the links of each pair being arranged on different sides of the longitudinal middle line of the body, and having their lower ends journaled to said frame structure and their upper ends journaled to said transverse structure, the normal position of the links of each pair being substantially symmetrical to the vertical longitudinal middle plane of the automobile, means for imparting to said frame structure and said transverse structure a movement relative to each other in a direction transversely to the longitudinal vertical middle plane of the automobile, means between said frame structure and said stub axles holding in plain view one point of each stub axle substantially stationary with respect to said frame structure if the transverse structure and said frame structure are moved transversely relative to each other, said points being spaced from said vertical axes a substantial distance in the longitudinal direction of the automobile.

17. In an automobile, a pair of stub axles, one ground wheel on each stub axle, a body or chassis frame structure, means for suspending one end of said frame structure on said stub axles and wheels, said means being adapted to allow each of said stub axles together with its wheel to turn about a substantially vertical axis, such axis being situated near to the plane of the respective wheel but spaced a substantial distance from the wheel center in the longitudinal direction of the automobile, means on said frame structure adapted to swing said stub axles in unison about said vertical axes, said frame structure comprising in the region of said stub axles a portion which presents in side view generally the form of an inverted U, said suspension means and said means for swinging said stub axles being attached at least partly to the downwardly extending arms of said U-shaped portion in regions between the ends of said arms.

18. In an automobile, a pair of stub axles, one ground wheel on each stub axle, a body or chassis frame structure, means for suspending one end of said frame structure on said stub axles and wheels, said means being adapted to allow each of said stub axles together with its wheel to turn about a substantially vertical axis such axis being situated near to the plane of the respective wheel but spaced a substantial distance from the wheel center in the longitudinal direction of the automobile, means on said frame structure adapted to swing said stub axles in unison about said vertical axes, said frame structure comprising in the region of said stub axle a downwardly facing transversely extending channel formed structure which is by its downwardly extending side walls structurally connected to the adjoining portions of the frame structure and forms a load-transmitting part thereof, said suspension means and said means for swinging said stub axles being attached at least partly to the opposite downwardly extending side walls of said channel formed structure.

19. In an automobile, a body or chassis frame structure, a first pair of ground wheels and means for suspending one end of said frame structure on said wheels, a driving motor being supported on said frame structure and arranged in the region of said first pair of wheels, a second pair of ground wheels and a pair of stub axles said stub axles supporting one wheel each of said second pair of wheels rotatably around substantially horizontal axes, means for suspending the other end of said frame structure on said stub axles and said second pair of wheels, said last-named means being adapted to allow each of said stub axles together with the respective wheel to swing about a point which point is located near to the plane of the respective wheel but spaced a substantial distance from the wheel center in the direction toward the other end of the automobile and which is substantially confined to an about vertical line being practically stationary with respect to said frame structure, means on said frame structure adapted to swing the wheels of said second pair in unison about said points, such steering movement of the wheels causing those parts of the wheels of the second pair which are located nearer to the other end of the automobile to move less toward the longitudinal center line of the automobile than those portions which are located in the direction of the adjacent end of said frame structure, the width of the automobile between the wheels of the second pair being greater on that side of the stub axle which lies toward the far end of the automobile than on the opposite side of the stub axle, thereby increasing the width of the useful space of the automobile between the wheels of the second pair.

JOSEPH LEDWINKA.